(12) United States Patent
Wang

(10) Patent No.: US 8,271,051 B2
(45) Date of Patent: Sep. 18, 2012

(54) METHOD AND SYSTEM FOR DOUBLE-END TALK DETECTION, AND METHOD AND SYSTEM FOR ECHO ELIMINATION

(75) Inventor: Guofeng Wang, Zhejiang (CN)

(73) Assignee: Via Telecom, Inc., San Diego, CA (US)

( * ) Notice: Subject to any disclaimer, the term of this patent is extended or adjusted under 35 U.S.C. 154(b) by 328 days.

(21) Appl. No.: 12/792,884

(22) Filed: Jun. 3, 2010

(65) Prior Publication Data

US 2011/0124380 A1  May 26, 2011

(30) Foreign Application Priority Data

Nov. 26, 2009 (CN) .......................... 2009 1 0224949

(51) Int. Cl.
*H04B 1/38* (2006.01)
*H04M 9/08* (2006.01)

(52) U.S. Cl. ................... 455/570; 455/296; 379/406.01; 379/406.05

(58) Field of Classification Search .................. 455/570, 455/296, 63.1, 67.13; 379/406.01–406.16
See application file for complete search history.

(56) References Cited

U.S. PATENT DOCUMENTS

| 5,631,900 A * | 5/1997 | McCaslin et al. .............. 370/287 |
| 6,282,176 B1 * | 8/2001 | Hemkumar ................... 370/276 |

(Continued)

FOREIGN PATENT DOCUMENTS

JP           408256089    * 10/1996

OTHER PUBLICATIONS

Hue Ye & Bo-Xiu Wu, "A New Double-Talk Detection Algorithm based on the Orthogonality Theorem", IEEE Transactions on Comm., vol. 39, No. 11, Nov. 1991.*

(Continued)

*Primary Examiner* — Duc M Nguyen
(74) *Attorney, Agent, or Firm* — Thomas|Kayden

(57) ABSTRACT

A method and system for eliminating echo in a speaker-microphone communication system are provided. The method includes the steps of: performing a noise energy estimating process on a local microphone signal in order to obtain an estimated noise signal, wherein the local microphone signal includes a local voice signal, possible background noise signal, and possible remote voice signal output from a speaker and received by a microphone; performing an echo estimating process on a remote voice signal to obtain an estimated echo signal, wherein the remote voice signal is output from the speaker; determining an error signal from the local microphone signal and the estimated echo signal; calculating a variance ($\sigma_e^2$) of the error signal and a variance ($\hat{\sigma}_n^2$) of the estimated noise signal; calculating a determinant ($\xi$), wherein the determinant ($\xi$) corresponds to the variance ($\sigma_e^2$) of the error signal and variance ($\hat{\sigma}_n^2$) of the estimated noise signal; and comparing the determinant ($\xi$) and a preset threshold, wherein when the determinant ($\xi$) is lower than the preset threshold, it is determined that double-end talk has not occurred, otherwise, it is determined that double-end talk has occurred.

20 Claims, 3 Drawing Sheets

U.S. PATENT DOCUMENTS

| | | | | |
|---|---|---|---|---|
| 6,415,029 B1* | 7/2002 | Piket et al. | | 379/406.04 |
| 6,434,110 B1* | 8/2002 | Hemkumar | | 370/201 |
| 6,744,884 B1* | 6/2004 | Bjarnason | | 379/406.01 |
| 7,212,628 B2* | 5/2007 | Popovic et al. | | 379/406.08 |
| 8,041,028 B2* | 10/2011 | Adeney | | 379/406.08 |
| 8,073,133 B2* | 12/2011 | Ishiguro et al. | | 379/406.08 |
| 8,184,818 B2* | 5/2012 | Ishiguro | | 381/66 |
| 2008/0101622 A1* | 5/2008 | Sugiyama | | 381/66 |
| 2010/0135483 A1* | 6/2010 | Mohammad et al. | | 379/406.08 |

OTHER PUBLICATIONS

Jacob Benesty, D. R. Morgan and J. H. Cho, "A New Class of DoubleTalk Detectors based on Cross-Correlation", IEEE Transactions on Speech and Audio Proc., vol. 8, No. 2, Mar. 2000.*

J. Lee & H.C. Huang, "A Robust Double-Talk Detector for Acoustic Echo Cancellation", Proc. of Inter. MultiConfer. of Engineers and Comp. Scientists 2010, vol. 11, IMECS 2010, Mar. 2010.*

* cited by examiner

METHOD AND SYSTEM FOR DOUBLE-END TALK DETECTION, AND METHOD AND SYSTEM FOR ECHO ELIMINATION

CROSS REFERENCE TO RELATED APPLICATIONS

This Application claims priority of China Patent Application No. 200910224949.9, filed on Nov. 26, 2009, the entirety of which is incorporated by reference herein.

BACKGROUND OF THE INVENTION

1. Field of the Invention

The present invention relates to methods and systems for echo elimination, and in particular, relates to methods and systems for double-end talk detection in a communication system.

2. Description of the Related Art

Recently, a hands free communication system, which comprises microphone and speaker and is implemented in a mobile phone and a phone conference device, has become popular. During a hands free communication process, there are at least two terminals performing communication using a hands free communication system. Generally, voice from one of the at least two terminals is referred to as local voice, and voice from the other terminal is referred to as remote voice. The remote voice signals are output by a speaker of the local terminal, wherein part of the remote voice signals are input into a microphone of the local terminal, and are inadvertently transmitted to other remote terminals. Accordingly, echo of the remote voice is generated, and the user may thus hear his/her own voice and echo of other people's voices. In this situation, the echo should be eliminated or cancelled.

In addition, thanks to improvements in modern technology, both output gain of a speaker and input gain of a microphone have substantially increased. For some communication devices, a microphone can receive sound from a speaker without switching to a hands free mode. Accordingly, echo elimination is also required.

For a general echo eliminator, an adaptive filter is utilized for estimating an echo route and composing estimated echo signals to eliminate the estimated echo signals. When voice is transmitted by either of the local terminal or the remote terminal, i.e., single-end talk, it is easy for the adaptive filter to estimate the echo route (for example, the room impulse response value h remains practically constant). When voice is transmitted by both of the local terminal and the remote terminal, i.e., double-end talk, the signals input from the local microphone (also referred to as local microphone signal) may comprise not only an echo of the remote voice, but also local voice and background noise. When double-end talk occurs, the filter coefficient of the adaptive filter strays from the real echo route impulse response. Therefore, adaptation of the coefficient of the adaptive filter should be disabled; otherwise, an incorrect estimation of the echo route would be obtained, and the echo elimination effect would be downgraded accordingly. A double talk detector is used for detecting double-end talk, and adaptation of the coefficient of the adaptive filter is disabled, accordingly. Therefore, double talk detection is important for echo elimination.

There are several methods for double-end talk detection. For example, in "Integrated Echo and Noise Canceller for Hands-Free Applications" (IEEE TRANSACTIONS ON CIRCUITS AND STEMS-II: ANALOG AND DIGITAL SIGNAL PROCESSING, VOL. 49, NO. 3, 2002, March), Seon Joon Park teaches a method for detecting double-end talk by calculating correlation coefficients between signals input from microphone and estimated echo signals, calculating correlation coefficients between signals input from microphone and the error signals (i.e., difference between signals input from microphone and estimated echo signals), and comparing the calculated results with thresholds.

More specifically, the conventional double-end talk detection in a communication system is described, as shown in FIG. 3. A double-end talk detection device calculates a correlation coefficient $\rho_{m\hat{y}}(k)$ between signals input from a microphone m(k) and estimated echo signals ŷ(k) and calculates a correlation coefficient $\rho_{me}(k)$ between signals input from microphone m(k) and e(k) error signals (i.e., m(k)−ŷ(k)) according to equations (1) and (2).

$$\rho_{m\hat{y}}(k) = \frac{P_{m\hat{y}}(k)}{\sqrt{P_m(k) \cdot P_{\hat{y}}(k)}}, \qquad \text{equation (1)}$$

$$\rho_{me}(k) = \frac{P_{me}(k)}{\sqrt{P_m(k) \cdot P_e(k)}}, \qquad \text{equation (2)}$$

The $P_{m\hat{y}}(k)$ represents correlation power between m(k) and ŷ(k), $P_{me}(k)$ represents correlation power between m(k) and e(k), $P_m(k)$ and represent power of m(k), $P_{\hat{y}}(k)$ represents power of ŷ(k), and $P_e(k)$ represents power of e(k).

In a simulation, the value of $|\rho_{m\hat{y}}(k)|$ approaches to 0 for a double-end talk, and the value of $|\rho_{m\hat{y}}(k)|$ approaches to 1 for a single-end talk. In addition, the value of $|\rho_{me}(k)|$ approaches to 1 for a double-end talk. Therefore, there are two threshold values T1 (for example, '0.19' near to 0) and T2 (0.9 near to 1). The $|\rho_{m\hat{y}}(k)|$ and threshold value T1 are compared, an the $|\rho_{me}(k)|$ and threshold value T2 are compared. When $|\rho_{m\hat{y}}(k)|$<T1 and $|\rho_{me}(k)|$>T2, the double-end talk detection device determines that double-end talk has occurred; otherwise, the double-end talk detection device determines that single-end talk has occurred or at least double-end talk has not occurred. According to this method, however, in reality, since the transition time periods for switching from double-end talk to single-end talk and for switching from a single-end talk to a double-end talk differ, it is difficult to select suitable thresholds T1 and T2 to correctly detect occurrence of double-end talk. In addition, because the double-end talk detecting device ignores the influence of noise and non-linear echo routes, performance of the double-end talk detecting device decreases when noise and non-linear echo routes exist under a speaker-microphone environment.

Consequently, there is a need for new and effective methods and systems for detecting double-end talk correctly and eliminating echo.

BRIEF SUMMARY OF THE INVENTION

A detailed description is given in the following embodiments with reference to the accompanying drawings.

According to an aspect of the present invention, a method for eliminating echo in a speaker-microphone communication system is provided, comprising the steps of: performing a noise energy estimating process on a local microphone signal in order to obtain an estimated noise signal, wherein the local microphone signal comprises a local voice signal, possible background noise signal, and possible remote voice signal output from a speaker and received by a microphone; performing an echo estimating process on a remote voice signal to obtain an estimated echo signal, wherein the remote voice signal is output from the speaker; determining an error signal from the local microphone signal and the estimated echo signal; calculating a variance ($\sigma_e^2$) of the error signal and a variance ($\hat{\sigma}_n^2$) of the estimated noise signal; calculating a determinant ($\xi$), wherein the determinant ($\xi$) corresponds to the variance ($\sigma_e^2$) of the error signal and variance ($\hat{\sigma}_n^2$) of the estimated noise signal; and comparing the determinant ($\xi$) and a preset threshold, wherein when the determinant ($\xi$) is lower than the preset threshold, it is determined that double-end talk has not occurred; otherwise, it is determined that double-end talk has occurred.

It is preferred that the determinant $\xi = c \cdot |\sigma_e^2 - \hat{\sigma}_n^2|$, and 'c' is a constant.

It is preferred that the determinant $$0 \leq \xi = 1 - \left|\frac{\hat{\sigma}_n^2}{\sigma_e^2}\right|.$$

It is preferred that the method further comprises: calculating a variance ($\hat{\sigma}_y^2$) of the estimated echo signal, wherein the determinant $$\xi = \left|\frac{\sigma_e^2 - \hat{\sigma}_n^2}{\hat{\sigma}_y^2}\right|.$$

It is preferred that the variance ($\sigma_e^2$) of the error signal, the variance ($\hat{\sigma}_n^2$) of the estimated noise signal, and/or the variance ($\hat{\sigma}_y^2$) of the estimated echo signal are calculated for a whole frequency domain or for a low frequency domain.

It is preferred that the determinant ($\xi$) is calculated for each frame, and the error signal of a current frame, the estimated noise signal of the current frame, and the estimated echo signal of the current frame are transferred, using N point Fast Fourier Transfer, to corresponding frequency domain signals, respectively, and the variance ($\sigma_e^2$) of the error signal, variance ($\hat{\sigma}_n^2$) of the estimated noise signal, or variance ($\hat{\sigma}_y^2$) of the estimated echo signal are calculated according to the following equations:

$$\sigma_e^2(i) = \lambda \sigma_e^2(i-1) + (1-\lambda)\sum_{j=0}^{P} E_j(i)$$

$$\hat{\sigma}_n^2(i) = \lambda \hat{\sigma}_n^2(i-1) + (1-\lambda)\sum_{j=0}^{P} Noise_j(i)$$

$$\hat{\sigma}_y^2(i) = \lambda \hat{\sigma}_y^2(i-1) + (1-\lambda)\sum_{j=0}^{P} \hat{Y}_j(i),$$

wherein $\sigma_e^2(i)$ is the variance of the error signal in the $i^{th}$ frame, $\hat{\sigma}_n^2(i)$ is the variance of the estimated noise signal in the $i^{th}$ frame, $\hat{\sigma}_y^2(i)$ is the variance of the estimated echo signal in the $i^{th}$ frame, $E_j(i)$ represents energy at frequency j of the frequency domain signal of the error signal in the $i^{th}$ frame, $Noise_j(i)$ represents energy at frequency j of the frequency domain signal of the noise signal in the $i^{th}$ frame, and $\hat{Y}_j(i)$ represents energy at frequency j of the frequency domain signal of the estimated echo signal in the $i^{th}$ frame, wherein $0.9 < \lambda < 1$, $\lambda$ is a real number, $0 < P \leq N/2 - 1$, P is a positive integral, and the value of P is determined by the non-linearity of the communication system.

It is preferred that when it is determined that double-end talk has occurred, the adaptation of adaptive filter is disabled.

According to another aspect of the present invention, a system for eliminating echo in a speaker-microphone communication system is provided, comprising: a noise energy estimating device, performing a noise energy estimating process on a local microphone signal in order to obtain an estimated noise signal, wherein the local microphone signal comprises a local voice signal, possible background noise signal, and possible remote voice signal output from a speaker and received by a microphone; an echo estimating device, performing an echo estimating process on a remote voice signal to obtain an estimated echo signal, wherein the remote voice signal is output from the speaker; an error signal determining device, determining an error signal from the local microphone signal and the estimated echo signal; a determinant calculator, calculating a determinant ($\xi$), wherein the determinant ($\xi$) corresponds to the variance ($\sigma_e^2$) of the error signal and variance ($\hat{\sigma}_n^2$) of the estimated noise signal; and a double-end talk detecting device, comparing the determinant ($\xi$) and a preset threshold, wherein when the determinant ($\xi$) is lower than the preset threshold, it is determined that double-end talk has not occurred; otherwise, it is determined that double-end talk has occurred.

It is preferred that the determinant calculator calculates the determinant as $\xi = c \cdot |\sigma_e^2 - \hat{\sigma}_n^2|$, and 'c' is a constant.

It is preferred that the determinant calculator calculates the determinant as $$0 \leq \xi = 1 - \left|\frac{\hat{\sigma}_n^2}{\sigma_e^2}\right|.$$

It is preferred that the determinant calculator further performs the step of: calculating a variance ($\hat{\sigma}_y^2$) of the estimated echo signal, wherein the determinant $$\xi = \left|\frac{\sigma_e^2 - \hat{\sigma}_n^2}{\hat{\sigma}_y^2}\right|.$$

It is preferred that the determinant calculator calculates variance ($\sigma_e^2$) of the error signal, the variance ($\hat{\sigma}_n^2$) of the estimated noise signal, and/or the variance ($\hat{\sigma}_y^2$) of the estimated echo signal for a whole frequency domain or for a low frequency domain.

It is preferred that the determinant calculator calculates the determinant ($\xi$) for each frame, and transfers, using N point Fast Fourier Transfer, the error signal of a current frame, the estimated noise signal of the current frame, and the estimated echo signal of the current frame to corresponding frequency domain signals, respectively, and calculates the variance ($\sigma_e^2$) of the error signal, variance ($\hat{\sigma}_n^2$) of the estimated noise signal, or variance ($\hat{\sigma}_y^2$) of the estimated echo signal according to the following equations:

$$\sigma_e^2(i) = \lambda \sigma_e^2(i-1) + (1-\lambda)\sum_{j=0}^{P} E_j(i)$$

$$\hat{\sigma}_n^2(i) = \lambda \hat{\sigma}_n^2(i-1) + (1-\lambda)\sum_{j=0}^{P} Noise_j(i)$$

-continued $$\hat{\sigma}_y^2(i) = \lambda\hat{\sigma}_y^2(i-1) + (1-\lambda)\sum_{j=0}^{P}\hat{Y}_j(i),$$

wherein $\sigma_e^2(i)$ is the variance of the error signal in the $i^{th}$ frame, $\hat{\sigma}_n^2(i)$ is the variance of the estimated noise signal in the $i^{th}$ frame, $\hat{\sigma}_y^2(i)$ is the variance of the estimated echo signal in the $i^{th}$ frame, $E_j(i)$ represents energy at frequency j of the frequency domain signal of the error signal in the $i^{th}$ frame, $\text{Noise}_j(i)$ represents energy at frequency j of the frequency domain signal of the noise signal in the $i^{th}$ frame, and $\hat{Y}_j(i)$ represents energy at frequency j of the frequency domain signal of the estimated echo signal in the $i^{th}$ frame, wherein $0.9<\lambda<1$, $\lambda$ is a real number, $0<P\leq N/2-1$, P is a positive integral, and the value of P is determined by the non-linearity of the communication system.

It is preferred that when the double-end talk detecting device determines that a double-end talk has occurred, the echo estimating adaptation process of the echo estimating coefficient is disabled.

According to another aspect of the present invention, a circuit for eliminating echo in a speaker-microphone communication system is provided. The system comprises a noise energy estimating device, an echo estimating device, and an error signal determining device. The circuit comprises a determinant calculator and a double-end talk detecting device. The determinant calculator is configured for calculating a determinant (ξ), wherein the determinant (ξ) corresponds to the variance ($\sigma_e^2$) of an error signal from the error signal determining device and variance ($\hat{\sigma}_n^2$) of an estimated noise signal from the noise energy estimating device. The double-end talk detecting device is configured for comparing the determinant (ξ) and a preset threshold, wherein when the determinant (ξ) is lower than the preset threshold, it is determined that double-end talk has not occurred, otherwise, it is determined that double-end talk has occurred.

The present invention determines whether a double-end talk has occurred by determining whether a determinant (ξ) corresponding to a variance ($\sigma_e^2$) of an error signal and a variance ($\hat{\sigma}_n^2$) of an estimated noise signal during a communication process is near a preset threshold. The present invention further considers influence of non-linear echo when double-end talk has occurred in order to clear up high frequency influence of non-linear echo; thereby correctly determining whether a double-end talk has occurred. Furthermore, for double-end talk occurrences, an echo estimating adaptation process/device (such as an adaptive filtering method/device for an adaptive coefficient) is disabled; thereby enabling efficient echo elimination.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
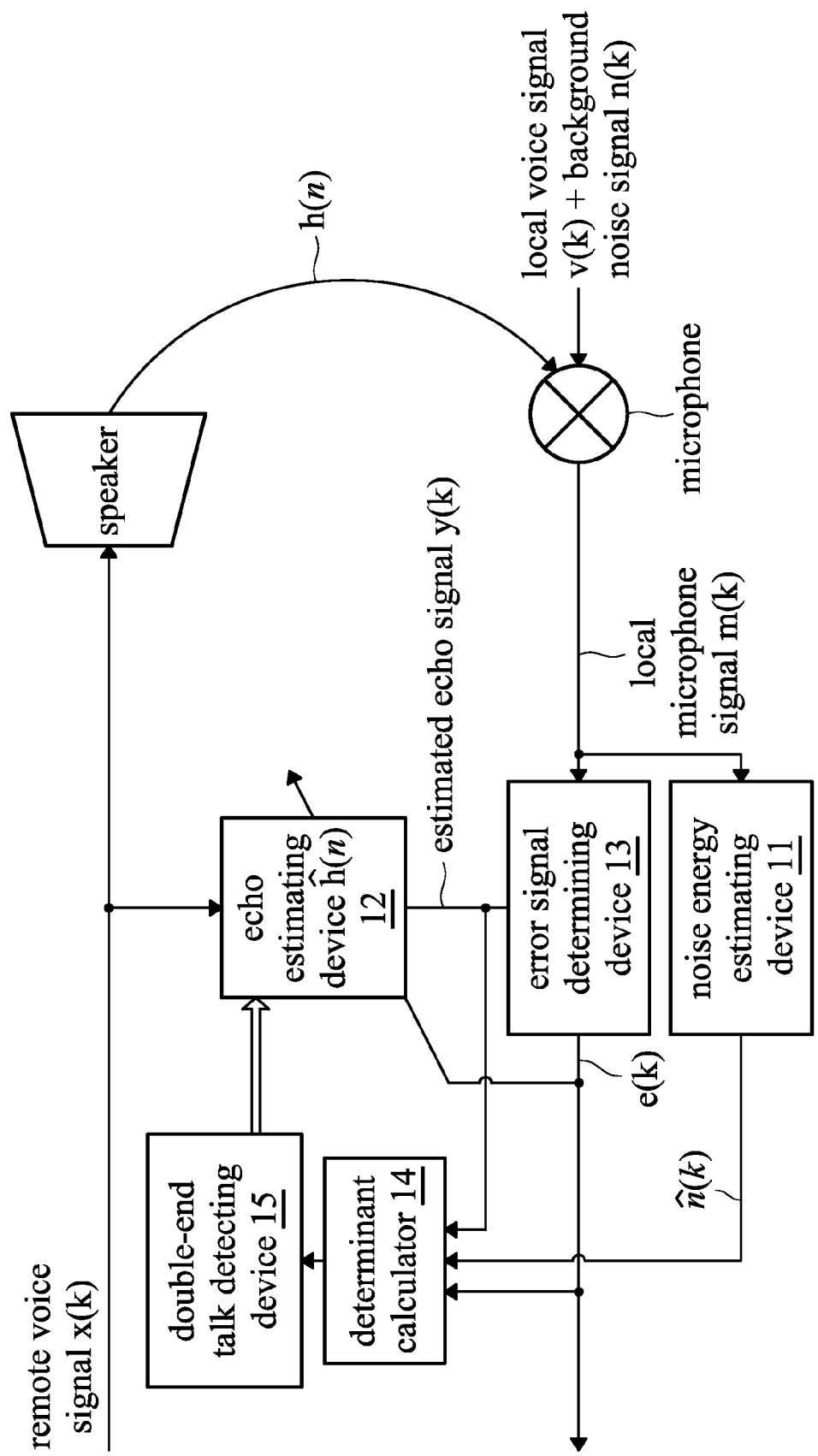
FIG. 1 is a schematic view of a communication system of an echo eliminating system of the present invention.

Referring to FIG. 1, which is a schematic view of a communication system of an echo eliminating system of the present invention.

The communication system comprises a speaker and a microphone, and an echo eliminating system 1. The echo eliminating system 1 comprises: a noise energy estimating device 11, performing a noise energy estimating process on a local microphone signal m(k) in order to obtain an estimated noise signal, wherein the local microphone signal may comprise: a local voice signal v(k), possible background noise signal n(k) and possible remote voice signal y(k) output from a speaker and received by a microphone; an echo estimating device 12, performing an echo estimating process on a remote voice signal to obtain an estimated echo signal, wherein the remote voice signal is output from the speaker; an error signal determining device 13, determining an error signal e(k) from the local microphone signal and the estimated echo signal; a determinant calculator 14, calculating a determinant (ξ) wherein the determinant (ξ) corresponds to the variance ($\sigma_e^2$) of the error signal and variance ($\hat{\sigma}_n^2$) of the estimated noise signal; and a double-end talk detecting device 15, comparing the determinant (ξ) and a preset threshold, wherein when the determinant (ξ) is lower than the preset threshold, it is determined that double-end talk has not occurred; otherwise, it is determined that double-end talk has occurred.

The described devices 11-15 can realize double-end talk detection. In addition to the devices 11-15, the echo eliminating system 1 further comprises: a remote voice signal detecting device (not shown), detecting a remote voice signal x(k) output from the speaker; and a local microphone signal receiving device (not shown), receiving a local microphone signal m(k) from the microphone. When no remote voice signal is detected by the remote voice signal detecting device and no microphone signal is received by the local microphone signal receiving device, the double-end talk detecting device 15 can determine that double-end talk has not occurred. Furthermore, when the double-end talk detecting device 15 determines that double-end talk has occurred, the echo estimating coefficient adaptation process of the echo estimating device is disabled, thereby enabling efficient echo elimination.

More specifically, the remote voice signal x(k) passes through the echo route h (for example, almost a constant such as a room impulse response value h), and the echo signal y(k) is received by the microphone, wherein k is a time index. Consequently, a real echo signal y(k) can be obtained by the following equation (3):

$$y(k)=h^T x \qquad\qquad \text{equation (3)},$$

wherein $h=[h_0\, h_1 \ldots h_{L-1}]^T$, $x=[x(k)\, x(k-1)\ldots x(k-L+1)]^T$, L represents length of the echo route, $h_0\, h_1 \ldots h_{L-1}$ are impulse response coefficients.

However, it is difficult to detect the real echo signals. Consequently, it is common to use the echo estimating device 12 of an adaptive filter to estimate the echo) route and generate the estimated echo signal ŷ(k). More specifically, the echo estimating coefficient of the echo estimating device 12, such as the adaptive filtering coefficient, is ĥ. Accordingly, an estimated echo signal ŷ(k) is obtained by performing the echo estimating process on the remote voice signal, i.e., according to the following equation (4):

$$\hat{y}(k)=\hat{h}^T x \qquad\qquad \text{equation (4)}.$$

Because the microphone signal m(k) input from the microphone may comprise a local voice signal v(k), a background noise signal n(k), an echo signal y(k), and the local microphone signal m(k) received by the local microphone signal receiving device can be determined according to the following equation (5):

$$m(k)=y(k)+v(k)+n(k) \qquad \text{equation (5)}$$

Accordingly, an error signal e(k) can be obtained from a difference between the local microphone signal m(k) and the estimated echo signal ŷ(k). The error signal determining device 13 can determine the error signal e(k) according to the following equation (6):

$$e(k)=m(k)-\hat{y}(k)=m(k)-\hat{h}^T x \qquad \text{equation (6)}$$

Because it is difficult to detect background noise signal n(k), it is common to use the noise energy estimating device 11 to perform a noise energy estimation to determine estimated noise n̂(k). It should be noted that, conventionally, there are several methods and devices for noise estimation. Herein, details thereof are not given here.

Accordingly, if there is only a remote voice signal and not a local voice signal, i.e., for occurrence of single-end talk, the local voice signal v(k) is near (or equal) to 0. Accordingly, the error signal e(k) and estimated noise signal n̂(k) are essentially the same or substantially equivalent to each other.

It can be determined whether the two values are equal or substantially equivalent by calculating a variance $\sigma_e^2$ of the error signal e(k) and a variance $\hat{\sigma}_n^2$ of the estimated noise signal n̂(k). Certainly, other methods can be used to determine whether the error signal e(k) and estimated noise signal n̂(k) are essentially the same. For example, the energy of the error signal and the energy of the noise signal may be calculated.

According to an embodiment of the present invention, the variance $\sigma_e^2$ of the error signal e(k) can be, but is not limited to, a calculation according to the following equation (7):

$$\sigma_e^2 = E[ee^T] \qquad \text{equation (7)}$$
$$= E\left[(m(k) - \hat{h}^T x)(m(k) - \hat{h}^T x)^T\right]$$
$$= E\left[(h^T x + v(k) + n(k) - \hat{h}^T x)(h^T x + v(k) + n(k) - \hat{h}^T x)^T\right]$$
$$= E\left[((h^T - \hat{h}^T)x + v(k) + n(k))((h^T - \hat{h}^T)x + v(k) + n(k))^T\right]$$

The E[*] represents a mathematical expected value.

Since the remote voice signal x(k), local voice signal v(k) and noise signal n(k) are generally independent from each other, the equation (7) can be revised as equation (8):

$$\sigma_e^2 = E\left[(h^T - \hat{h}^T)xx^T(h - \hat{h})\right] + E[v^2] + E[n^2] \qquad \text{equation (8)}$$
$$= (h^T - \hat{h}^T)R_{xx}(h - \hat{h}) + \sigma_v^2 + \sigma_n^2$$

In equation (8), $R_{xx}=[xx^T]$, and $\sigma_v^2$ represents a variance of the local voice signal v(k).

It should be noted that, conventionally, there are several methods and devices for calculating variance $\sigma_n^2$ the noise signal. Here, details thereof are not given here.

When the local voice signal v(k) is near (or equal to) 0, i.e., no local voice signal exists, i.e., when signal-end talk has occurred, the variance $\sigma_v^2$ of the local voice signal v(k) is near (or equal to) 0. In this situation, the variance $\sigma_e^2$ of the error signal should correspond to (near, equal to) the variance $\hat{\sigma}_n^2$ of the estimated noise signal. Accordingly, when the double-end talk detecting device 15 ascertains that the variance $\sigma_e^2$ of the error signal equals to the variance $\hat{\sigma}_n^2$ of the estimated noise signal, then it is determined that double-end talk has not occurred, and single-end talk has; otherwise, it is determined that double-end talk has occurred.

In one embodiment, the double-end talk detecting device 15 is configured for comparing the variance $\sigma_e^2$ of the error signal and the variance $\hat{\sigma}_n^2$ of the estimated noise signal, and for determining that double-end talk has not occurred when the absolute difference value is lower than the preset value; otherwise, it is determined that double-end talk has occurred.

According to an embodiment of the present invention, a determinant ξ for detecting double-end talk can be defined by the equation (9a):

$$\xi=|\sigma_e^2-\hat{\sigma}_n^2| \qquad \text{equation (9a)}$$

In another embodiment, a constant value can be determined by simulation, and the absolute difference value ($|\sigma_e^2-\hat{\sigma}\sigma_n^2|$) is multiplied by a constant c, and then being compared with the preset threshold. If the product of absolute difference value ($|\sigma_e^2-\hat{\sigma}_n^2|$) and the constant c is lower than the preset threshold, then the double-end talk detecting device 15 determines that double-end talk has not occurred; otherwise, it is determined that double-end talk has occurred. Accordingly, a determinant ξ can be defined by the equation (9b):

$$\xi=c\cdot|\sigma_e^2-\hat{\sigma}_n^2| \qquad \text{equation (9b)}$$

In another embodiment, the double-end talk detecting device 15 may calculate an absolute ratio of a difference between the variance $\sigma_e^2$ of the error signal and the variance $\hat{\sigma}_n^2$ of the estimated noise signal and the variance $\hat{\sigma}_y^2$ of the estimated echo signal, and compare the absolute ratio with a preset threshold. When the ratio is lower than the preset threshold, it is determined that double-end talk has not occurred. In this embodiment, the difference between the variance $\sigma_e^2$ of the error signal and the variance $\hat{\sigma}_n^2$ of the estimated noise signal is divided with the variance $\hat{\sigma}_y^2$ of the estimated echo signal. Thus, a relative proportional value of the difference between the variance $\sigma_e^2$ of the error signal and the variance $\hat{\sigma}_n^2$ of the estimated noise signal and the variance $\hat{\sigma}_y^2$ of the estimated echo signal is obtained. According to the relative proportional value, it can be determined, more precisely, whether the variance $\sigma_e^2$ of the error signal and the variance $\hat{\sigma}_n^2$ of the estimated noise signal are equal. In other words, when the difference between the variance $\sigma_e^2$ of the error signal and the variance $\hat{\sigma}_n$ of the estimated noise signal is greater, a more stable proportional value can be obtained by dividing the difference with the variance ($\hat{\sigma}_y^2$) of the estimated echo signal (which might be greater, too). Consequently, setting up of the preset threshold is easier for implementing precise detection.

More specifically, a determinant ξ can be defined by the equation (9c):

$$\xi = \left|\frac{\sigma_e^2 - \hat{\sigma}_n^2}{\hat{\sigma}_y^2}\right| \qquad \text{equation (9c)}$$

The $\sigma_e^2$ represents a variance of an error signal, the $\hat{\sigma}_n^2$ represents a variance of a noise signal, and the $\hat{\sigma}_y^2$ represents a variance of an estimated echo signal. Accordingly, if ξ is near 0, the double-end talk detecting device 15 determines that double-end talk has not occurred; otherwise, the double-end talk detecting device 15 determines that double-end talk has occurred. More specifically, if the ξ is lower than a preset threshold, the double-end talk detecting device 15 determines that double-end talk has not occurred; otherwise, the double-end talk detecting device 15 determines that double-end talk has occurred.

In another embodiment, a double-end talk detecting device 15 may be configured for comparing a ratio between the variance $\hat{\sigma}_n^2$ of the estimated noise signal and the variance $\sigma_e^2$ of the error signal with a preset threshold. Since the error signals comprise noise signals, the ratio between the variance $\hat{\sigma}_n^2$ of the estimated noise signal and the variance $\sigma_e^2$ of the error signal is a value resides between 0 and 1. A determinant $\xi$ can be defined by the equation (9d).

$$0 \le \xi = 1 - \left| \frac{\hat{\sigma}_n^2}{\sigma_e^2} \right| \qquad \text{equation (9d)}$$

When there is only a remote voice signal but no local voice signal, i.e., double-end talk has not occurred, the $$\left| \frac{\hat{\sigma}_n^2}{\sigma_e^2} \right|$$

value is near 1. Thus, the determinant $\xi$ is near 0. When there are local voice signals, the $$\left| \frac{\hat{\sigma}_n^2}{\sigma_e^2} \right|$$

value might be lower than 1. Thus, the determinant $\xi$ is not near 0. Accordingly, the preset threshold can be determined by simulation, and when the $\xi$ value is lower than the preset threshold, it is determined that double-end talk has not occurred.

According to equations (9a)~(9d), the determinant $\xi$ relates to the variance $\sigma_e^2$ of the error signal and the variance $\hat{\sigma}_n^2$ of the estimated noise signal.

In addition, it should be well-known by those of ordinary skill in the art, that a variance $\sigma_y^2$ of real echo signals can be determined by equation (10).

$$\sigma_y^2 = E[yy^T] \qquad \text{equation (10)}$$
$$= E[h^T x x^T h]$$
$$= h^T R_{xx} h$$

Furthermore, $$\hat{\sigma}_y^2 = \hat{h}^T R_{xx} \hat{h}. \qquad \text{equation (11)}.$$

Accordingly, the $\xi$ in equation (9c) can be revised as follows.

$$\xi = \left| \frac{\sigma_e^2 - \hat{\sigma}_n^2}{\hat{\sigma}_y^2} \right|$$
$$= \left| \frac{(h^T - \hat{h}^T) R_{xx} (h - \hat{h}) + \sigma_v^2 + \sigma_n^2 - \hat{\sigma}_n^2}{h^T R_{xx} h} \right|$$

This further illustrates that, when there is no local voice signal, i.e., in equation (12), the $\sigma_v^2$ is near or equal to 0, $h^T$ is near $\hat{h}^T$, h is near $\hat{h}$, $\sigma_n^2$ is near $\hat{\sigma}_n^2$, it can be determined that double-end talk has not occurred when the $|\sigma_e^2 - \hat{\sigma}_n^2|$ value in equations (9a)-(9c) is near 0; otherwise, it can be determined that double-end talk has occurred.

The following paragraphs provide discussion concerning calculation of the variance $\sigma_e^2$ of the error signal, the variance $\hat{\sigma}_n^2$ of the estimated noise signal, and the variance $\hat{\sigma}_y^2$ of the estimated echo signal.

The variance $\sigma_e^2$ of the error signal, the variance $\hat{\sigma}_n^2$ of the estimated noise signal, and the variance $\hat{\sigma}_y^2$ of the estimated echo signal can be calculated over a time domain or a frequency domain. The present invention focuses on calculation over the frequency domain. The determinant $\xi$ can be calculated for each frame.

First, the following is defined.

$$E(i) = [E_0(i) E_1(i) \ldots E_{N-1}(i)]^T \stackrel{\triangle}{=} FFT[e(iM)] \qquad \text{equation (13)}$$

$$N(i) = [\text{Noise}_0(i) \text{Noise}_1(i) \ldots \text{Noise}_{N-1}(i)]^T \stackrel{\triangle}{=} FFT[n(iM)] \qquad \text{equation (14)}$$

$$\hat{Y}(i) = [\hat{Y}_0(i) \hat{Y}_1(i) \ldots \hat{Y}_{N-1}(i)]^T \stackrel{\triangle}{=} FFT[\hat{y}(iM)] \qquad \text{equation (15)}$$

The 'i' represents a frame index, M represents a frame size, N represents a window size for fast Fourier transform, and FFT[*] represents implementing windowed fast Fourier transform by overlapping.

The E(i), N(i), and $\hat{Y}(i)$ are one-dimensional matrices, and the italic $E_j(i)$ represents energy at frequency j after FFT transformation. N outputs are generated from an N point FFT transformation, the E(i) represents an output from the N point FFT transformation of the error signals in the $i^{th}$ frame. Similarly, the N(i) and $\hat{Y}(i)$ represent outputs from the N point FFT transformation of the estimated noise signals and estimated echo signals in the $i^{th}$ frame.

In an embodiment of the present invention, M is 80, N is 128. Of course, values of the M and N are not limited to the described values.

The described equation can be calculated by the following equations, wherein k is a time index, and if k is substituted by iM, then the e(iM), n(iM), ŷ(iM) are spaced by intervals M (i.e., data for a frame).

$$e(k) \stackrel{\triangle}{=} [e(k) e(k-1) \ldots e(k-N+1)]^T .* [w(0) w(1) \ldots w(N-1)]^T \qquad \text{equation (16)}$$

$$n(k) \stackrel{\triangle}{=} [n(k) n(k-1) \ldots n(k-N+1)]^T .* [w(0) w(1) \ldots w(N-1)]^T \qquad \text{equation (17)}$$

$$\hat{y}(k) \stackrel{\triangle}{=} [y(k) y(k-1) \ldots y(k-N+1)]^T .* [w(0) w(1) \ldots w(N-1)]^T \qquad \text{equation (18)}$$

The symbols ".*" represents a dot product operation. The w(0) ... w(N−1) are window functions. It should be well-known by those of ordinary skill in the art, that before transformation from a time domain to a frequency domain, window functions (such as a hanning window) can be added to time domain signals.

The variance $\sigma_e^2$ of the error signal, the variance $\hat{\sigma}_n^2$ of the estimated noise signal, and the variance $\hat{\sigma}_y^2$ of the estimated echo signal can be calculated by an index recursive weighted algorithm. More specifically, the algorithm is calculated according to the following equations.

$$\sigma_e^2(i) = \lambda\sigma_e^2(i-1) + (1-\lambda)\sum_{j=0}^{j=\frac{N}{2}-1} E_j(i) \qquad \text{equation (19)}$$

$$\hat{\sigma}_n^2(i) = \lambda\hat{\sigma}_n^2(i-1) + (1-\lambda)\sum_{j=0}^{j=\frac{N}{2}-1} Noise_j(i) \qquad \text{equation (20)}$$

$$\hat{\sigma}_y^2(i) = \lambda\hat{\sigma}_y^2(i-1) + (1-\lambda)\sum_{j=0}^{j=\frac{N}{2}-1} \hat{Y}_j(i) \qquad \text{equation (21)}$$

In these equations, $0.9<\lambda<1$ and $0<=j<=N-1$.

The $E_j(i)$ represents energy at j generated from N point FFT transformation of data of the $i^{th}$ frame of the error signals. Similarly, $Noise_j(i)$, $\hat{Y}_j(i)$ represent energy at j generated from N point FFT transformation of data of the $i^{th}$ frame of the estimated noise signals and estimated echo signals.

The variance $\sigma_e^2$ of the error signal, the variance $\hat{\sigma}_n^2$ of the estimated noise signal, and the variance $\hat{\sigma}_y^2$, of the estimated echo signal can be accordingly calculated, along with the determinant $\xi$.

According to equations (19)-(21), in a frequency range from j=0 to j=(N/2-1) (i.e., in the whole frequency domain), energy of error signals, energy of estimated noise signals, and energy of estimated echo signals of a current frame can be calculated by calculating sums of $E_j(i)$, $Noise_j(i)$, and $\hat{Y}_j(i)$, respectively.

Generally, in communication systems implemented for real mobile phone applications, or telephone conferences, a speaker is driven by a maximum voltage to amplify volume of the speaker. Consequently, saturation output occurs in the speaker, resulting in non-linearity. The non-linearity is known as harmonic distortion, i.e., generation of a large amount of harmonic components. In other words, the remote voice signals have low frequency (such as 450 Hz) before they are digital/analog converted and output from the speaker. When the remote voice signals are output from the speaker and received by the microphone, the received local microphone signals comprise not only noise signals, but also other high frequency components, such as 900 Hz, 1350 Hz, 2250 Hz, and 3150 Hz. Conventionally, a linear adaptive filter (an exemplary embodiment of the echo estimating device 12) can estimate linear echo. Accordingly, a linear adaptive filter can eliminate linear echo by subtracting the estimated echo signals generated by the linear adaptive filter from the local microphone signals. In other words, echo at frequency 450 Hz can be eliminated, while non-linear echo (such as echo at frequency 900 Hz, 1350 Hz, 2250 Hz, and 3150 Hz) cannot be eliminated. Generally, speaker signals at frequency f influences residual echo signals at frequency 900 Hz, 1350 Hz, 2250 Hz, and 3150 Hz. In other words, residual non-linear echo signals belong to the high frequency domain. Because multiple harmonic components of low-frequency components overlap in the high frequency domain, in a domain with higher frequencies, the impact of harmonic components is more serious. Consequently, residual high-frequency non-linear echo causes problems for double-end talk detection.

Accordingly, the invention improves upon calculating energy of the error signal, energy of estimated noise signals, and energy of estimated echo signals of a current frame. That is, the calculation can apply only to the frequency components in the low-frequency domain and not the high-frequency domain impacted by harmonic components. As a result, the influence caused by residual high-frequency non-linear echo for double-end talk detection is reduced or eliminated. More specifically, the equations (19), (20), (21) can be revised as follows.

$$\sigma_e^2(i) = \lambda\sigma_e^2(i-1) + (1-\lambda)\sum_{j=0}^{P} E_j(i) \qquad \text{equation (22)}$$

$$\hat{\sigma}_n^2(i) = \lambda\hat{\sigma}_n^2(i-1) + (1-\lambda)\sum_{j=0}^{P} Noise_j(i) \qquad \text{equation (23)}$$

$$\hat{\sigma}_y^2(i) = \lambda\hat{\sigma}_y^2(i-1) + (1-\lambda)\sum_{j=0}^{P} \hat{Y}_j(i) \qquad \text{equation (24)}$$

In the described equations, $0<P<N/2-1$. The value of P can be determined by non-linearity of the communication system. In other words, according to an original energy calculation, the range $0<j<N/2-1$ covers the whole frequency domain (for example, the frequency domain is 0~4000 Hz at a sampling rate of 8000 Hz); while for the improved energy calculation, $0<j<P$, and $0<P<N/2-1$. Thus, the calculation is only executed on the frequency components in the low-frequency domain. As a result, the influence caused by residual high-frequency non-linear echo during double-end talk detection is reduced or eliminated, and accuracy of double-end talk detection can be improved, wherein echo elimination can be more perfectly realized.

Figure 2:
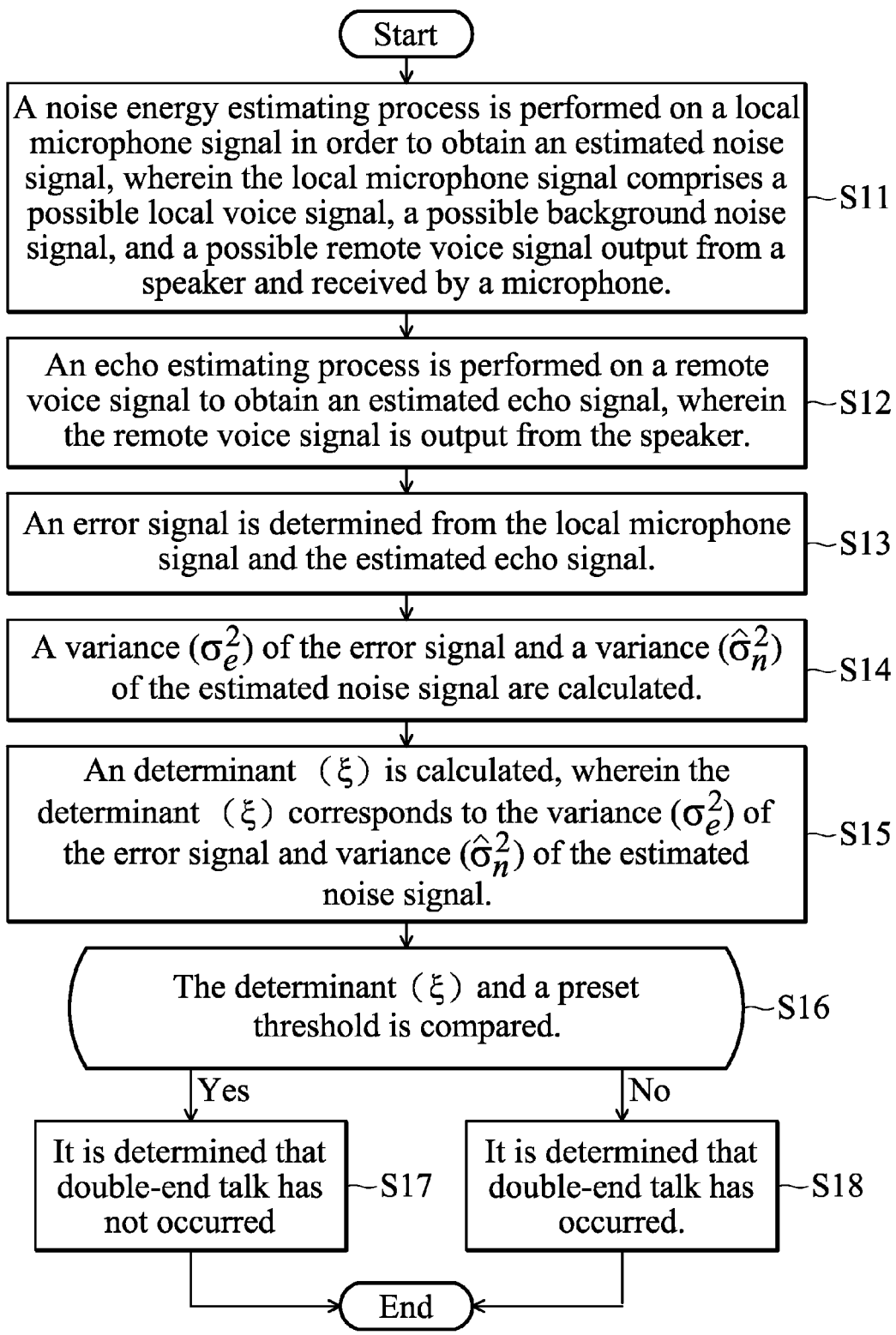
FIG. 2 is a flowchart of an echo eliminating method of the present invention.
Figure 3:
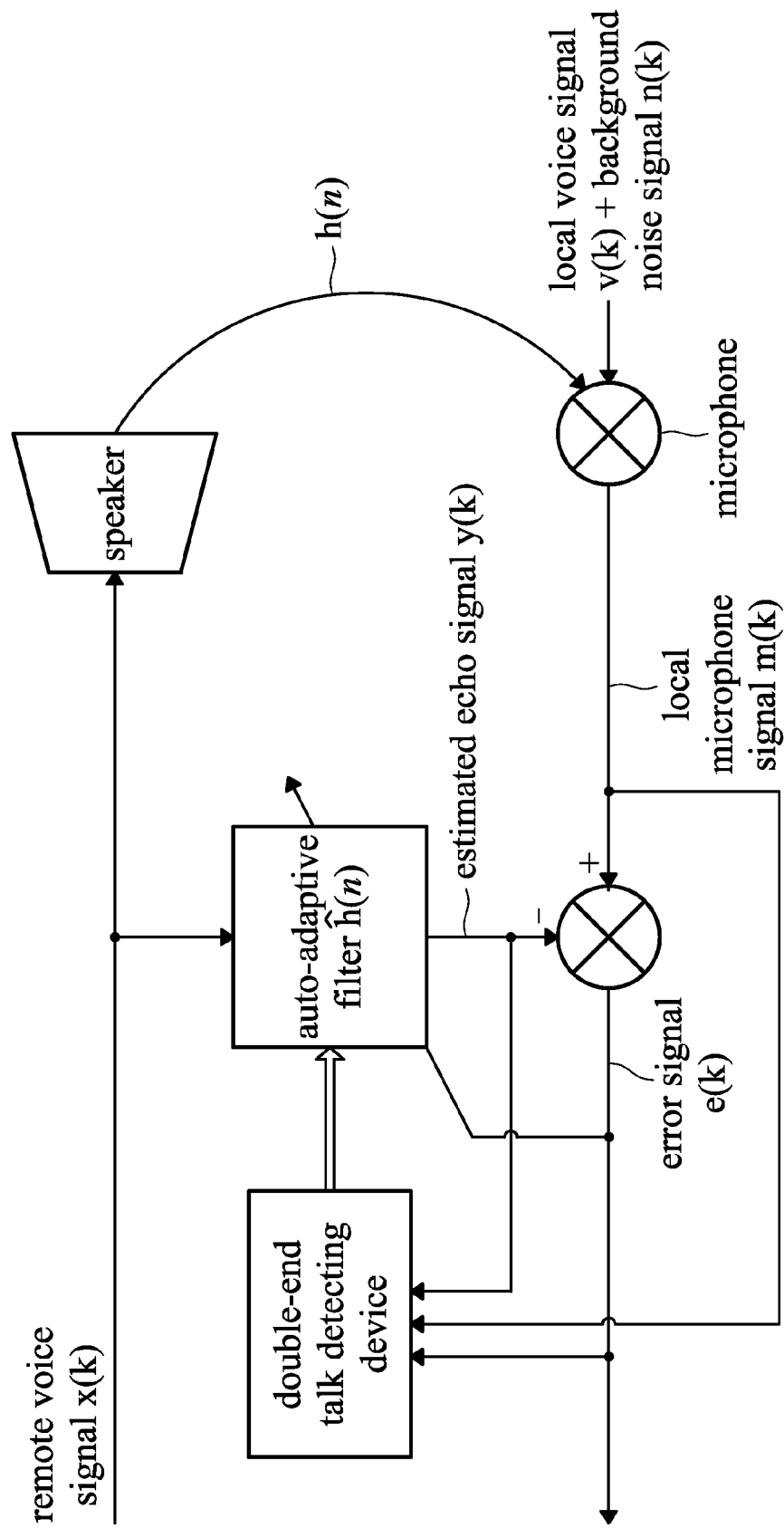
FIG. 3 is a schematic view of a communication system of a conventional echo eliminating system.

Referring to FIG. 2, a flowchart of an echo eliminating method of the present invention is illustrated.

First, in step S11, a noise energy estimating process is performed on a local microphone signal in order to obtain an estimated noise signal, wherein the local microphone signal comprises a possible local voice signal, a possible background noise signal, and a possible remote voice signal output from a speaker and received by a microphone.

In step S12, an echo estimating process is performed on a remote voice signal to obtain an estimated echo signal, wherein the remote voice signal is output from the speaker.

In step S13, an error signal is determined from the local microphone signal and the estimated echo signal.

In step S14, a variance ($\sigma_e^2$) of the error signal and a variance ($\hat{\sigma}_n^2$) of the estimated noise signal are calculated.

In step S15, an determinant ($\xi$) is calculated, wherein the determinant ($\xi$) corresponds to the variance ($\sigma_e^2$) of the error signal and variance ($\hat{\sigma}_n^2$) of the estimated noise signal.

In step S16, the determinant ($\xi$) and a preset threshold is compared. When the determinant ($\xi$) is lower than the preset threshold, it is determined in step S17 that double-end talk has not occurred; otherwise, it is determined in step S18 that double-end talk has occurred.

Thus, the method is finished.

In the described method, the remote voice signals output from the speaker and the local microphone signals received by the microphone can be detected first. In a case where no remote voice signal exists or no local microphone signal is received, it can be determined directly that double-end talk has not occurred. Thus, speeding up detection.

In step S15 of the method, in the calculation of the determinant ($\xi$), the determinant can be calculated as $\xi = c \cdot |\sigma_e^2 - \hat{\sigma}_n^2|$, and 'c' is a constant.

In step S15 of the method, the determinant can be calculated as $$0 \le \xi = 1 - \left|\frac{\hat{\sigma}_n^2}{\sigma_e^2}\right|.$$

In step S15 of the method, the determinant can be calculated as $$\xi = \left|\frac{\sigma_e^2 - \hat{\sigma}_n^2}{\hat{\sigma}_y^2}\right|$$

by calculating a variance ($\hat{\sigma}_y^2$) of the estimated echo signal.

The variance ($\sigma_e^2$) of the error signal, the variance ($\hat{\sigma}_n^2$) of the estimated noise signal, and/or the variance ($\hat{\sigma}_y^2$) of the estimated echo signal are calculated for a whole frequency domain or for a low frequency domain, and the determinant ($\xi$) is calculated for each frame.

The error signal of a current frame, the estimated noise signal of the current frame, the estimated echo signal of the current frame are transferred, using N point Fast Fourier Transfer, to corresponding frequency domain signals, respectively, and the variance ($\sigma_e^2$) of the error signal, variance ($\hat{\sigma}_n^2$) of the estimated noise signal, or variance ($\hat{\sigma}_y^2$) of the estimated echo signal are calculated according to the following equations:

$$\sigma_e^2(i) = \lambda \sigma_e^2(i-1) + (1-\lambda) \sum_{j=0}^{P} E_j(i)$$

$$\hat{\sigma}_n^2(i) = \lambda \hat{\sigma}_n^2(i-1) + (1-\lambda) \sum_{j=0}^{P} Noise_j(i)$$

$$\hat{\sigma}_y^2(i) = \lambda \hat{\sigma}_y^2(i-1) + (1-\lambda) \sum_{j=0}^{P} \hat{Y}_j(i),$$

wherein $\sigma_e^2(i)$ is the variance of the error signal in the $i^{th}$ frame, $\hat{\sigma}_n^2(i)$ is the variance of the estimated noise signal in the $i^{th}$ frame, $\hat{\sigma}_y^2(i)$ is the variance of the estimated echo signal in the $i^{th}$ frame, $E_j(i)$ represents energy at frequency j of the frequency domain signal of the error signal in the $i^{th}$ frame, $Noise_j(i)$ represents energy at frequency j of the frequency domain signal of the noise signal in the $i^{th}$ frame, and $\hat{Y}_j(i)$ represents energy at frequency j of the frequency domain signal of the estimated echo signal in the $i^{th}$ frame, wherein $0.9<\lambda<1$, $\lambda$ is a real number, $0<P\le N/2-1$, P is a positive integral, and the value of P is determined by the non-linearity of the communication system In short, the calculation of variance of the error signal, the variance of the estimated noise signal, and/or the variance of the estimated echo signal can be accomplished utilizing the described method or other known methods. Herein, unnecessary details thereof are not given. The preset threshold used for comparison with the determinant can be set by simulation, experience, or manual settings according to the calculation method of the determinant.

When it is determined that double-end talk has occurred according to the system and method of the present invention, the echo estimating adaptation process of the echo estimating coefficient implemented by the adaptive filter (which is an exemplary embodiment of the echo estimating device 12) or in an echo estimating step, is disabled, in order to obtain an accurate estimated echo route for double-end talk occurrences. Accordingly, echo is correctly estimated and eliminated. There are several methods and systems for echo estimation in conventional technology. Herein, unnecessary details thereof are not given.

As described, the echo eliminating method and system of the present invention detects double-end talk by determining whether a determinant ($\xi$) corresponding to a variance ($\hat{\sigma}_n^2$) of the estimated noise signal and a variance ($\sigma_e^2$) of the error signal approaches to a preset threshold. The present invention further considers influence of non-linear echo when double-end talk has occurred, in order to clear up high frequency influence of non-linear echo, thereby correctly determining whether double-end talk has occurred. Furthermore, for double-end talk occurrences, an echo estimating adaptation process/device (such as an adaptive filtering method/device for an adaptive coefficient) is disabled; thereby enabling efficient echo elimination.

According to another embodiment in accordance of the present invention, a circuit for eliminating echo in a speaker-microphone communication system is provided. The system comprises a noise energy estimating device, an echo estimating device, and an error signal determining device. The circuit comprises a determinant calculator and a double-end talk detecting device. The determinant calculator is configured for calculating a determinant ($\xi$), wherein the determinant ($\xi$) corresponds to the variance ($\sigma_e^2$) of an error signal from the error signal determining device and variance ($\hat{\sigma}_n^2$) of an estimated noise signal from the noise energy estimating device. The double-end talk detecting device is configured for comparing the determinant ($\xi$) and a preset threshold, wherein when the determinant ($\xi$) is lower than the preset threshold, it is determined that double-end talk has not occurred, otherwise, it is determined that double-end talk has occurred.

It should be understood by those of ordinary skill in the art, that the steps of the described method can be executed in a time sequence or not in a time sequence. Also, steps of the described method can be executed independently or in parallel. The described device can represent a hardware apparatus, a software module, or firmware. The described devices can be separated into more parts or be combined into fewer devices.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for eliminating echo in a speaker-microphone communication system, comprising
    performing a noise energy estimating process on a local microphone signal in order to obtain an estimated noise signal, wherein the local microphone signal comprises a local voice signal, possible background noise signal, and possible remote voice signal output from a speaker and received by a microphone;
    performing an echo estimating process on a remote voice signal to obtain an estimated echo signal, wherein the remote voice signal is output from the speaker;
    determining an error signal from the local microphone signal and the estimated echo signal;
    calculating a variance ($\sigma_e^2$) of the error signal and a variance ($\hat{\sigma}_n^2$) of the estimated noise signal;

calculating a determinant ($\xi$), wherein the determinant ($\xi$) corresponds to the variance ($\sigma_e^2$) of the error signal and variance ($\hat{\sigma}_n^2$) of the estimated noise signal; and comparing the determinant ($\xi$) and a preset threshold, wherein when the determinant ($\xi$) is lower than the preset threshold, it is determined that double-end talk has not occurred, otherwise, it is determined that double-end talk has occurred.

2. The method as claimed in claim 1, wherein the determinant $\xi = c \cdot |\sigma_e^2 - \hat{\sigma}_n^2|$, and 'c' is a constant.

3. The method as claimed in claim 1, wherein the determinant $$0 \le \xi = 1 - \left|\frac{\hat{\sigma}_n^2}{\sigma_e^2}\right|.$$

4. The method as claimed in claim 1, further comprising: calculating a variance ($\hat{\sigma}_y^2$) of the estimated echo signal, wherein the determinant $$\xi = \left|\frac{\sigma_e^2 - \hat{\sigma}_n^2}{\hat{\sigma}_y^2}\right|.$$

5. The method as claimed in claim 4, wherein the variance ($\sigma_e^2$) of the error signal, the variance ($\hat{\sigma}_n^2$) of the estimated noise signal, and/or the variance ($\hat{\sigma}_y^2$) of the estimated echo signal are calculated for a whole frequency domain or for a low frequency domain.

6. The method as claimed in claim 5, wherein the determinant ($\xi$) is calculated for each frame, and the error signal of a current frame, the estimated noise signal of the current frame, and the estimated echo signal of the current frame are transferred, using N point Fast Fourier Transfer, to corresponding frequency domain signals, respectively, and the variance ($\sigma_e^2$) of t the error signal, variance ($\hat{\sigma}_n^2$) of the estimated noise signal, or variance ($\hat{\sigma}_y^2$) of the estimated echo signal are calculated according to the following equations:

$$\sigma_e^2(i) = \lambda \sigma_e^2(i-1) + (1-\lambda)\sum_{j=0}^{P} E_j(i)$$

$$\hat{\sigma}_n^2(i) = \lambda \hat{\sigma}_n^2(i-1) + (1-\lambda)\sum_{j=0}^{P} Noise_j(i)$$

$$\hat{\sigma}_y^2(i) = \lambda \hat{\sigma}_y^2(i-1) + (1-\lambda)\sum_{j=0}^{P} \hat{Y}_j(i),$$

wherein $\sigma_e^2(i)$ is the variance of the error signal in the $i^{th}$ frame, $\hat{\sigma}_n^2(i)$ is the variance of the estimated noise signal in the $i^{th}$ frame, $\hat{\sigma}_y^2(i)$ is the variance of the estimated echo signal in the $i^{th}$ frame, $E_j(i)$ represents energy at frequency j of the frequency domain signal of the error signal in the $i^{th}$ frame, $Noise_j(i)$ represents energy at frequency j of the frequency domain signal of the noise signal in the $i^{th}$ frame, and $\hat{Y}_j(i)$ represents energy at frequency j of the frequency domain signal of the estimated echo signal in the $i^{th}$ frame, wherein $0.9 < \lambda < 1$, $\lambda$ is a real number, $0 < P \le N/2 - 1$, P is a positive integral, and the value of P is determined by the non-linearity of the communication system.

7. The method as claimed in claim 1, wherein when it is determined that double-end talk has occurred, the echo estimating adaptation process of the echo estimating coefficient is disabled.

8. A system for eliminating echo in a speaker-microphone communication system, comprising:
a noise energy estimating device, performing a noise energy estimating process on a local microphone signal in order to obtain an estimated noise signal, wherein the local microphone signal comprises a local voice signal, possible background noise signal, and possible remote voice signal output from a speaker and received by a microphone;
an echo estimating device, performing an echo estimating process on a remote voice signal to obtain an estimated echo signal, wherein the remote voice signal is output from the speaker;
an error signal determining device, determining an error signal from the local microphone signal and the estimated echo signal;
a determinant calculator, calculating a determinant ($\xi$), wherein the determinant ($\xi$) corresponds to the variance ($\sigma_e^2$) of the error signal and variance ($\hat{\sigma}_n^2$) of the estimated noise signal; and
a double-end talk detecting device, comparing the determinant ($\xi$) and a preset threshold, wherein when the determinant ($\xi$) is lower than the preset threshold, it is determined that double-end talk has not occurred, otherwise, it is determined that double-end talk has occurred.

9. The system as claimed in claim 8, wherein the determinant calculator calculates the determinant as $\xi = c \cdot |\sigma_e^2 - \hat{\sigma}_n^2|$, and 'c' is a constant.

10. The system as claimed in claim 8, wherein the determinant calculator calculates the determinant as $$0 \le \xi = 1 - \left|\frac{\hat{\sigma}_n^2}{\sigma_e^2}\right|.$$

11. The system as claimed in claim 8, wherein the determinant calculator further performs the step of:
calculating a variance ($\hat{\sigma}_y^2$) of the estimated echo signal, wherein the determinant $$\xi = \left|\frac{\sigma_e^2 - \hat{\sigma}_n^2}{\hat{\sigma}_y^2}\right|.$$

12. The system as claimed in claim 11, wherein the determinant calculator calculates variance ($\sigma_e^2$) of the error signal, the variance ($\hat{\sigma}_n^2$) of the estimated noise signal, and/or the variance ($\hat{\sigma}_y^2$) of the estimated echo signal for a whole frequency domain or for a low frequency domain.

13. The system as claimed in claim 12, wherein the determinant calculator calculates the determinant ($\xi$) for each frame, and transfers, using N point Fast Fourier Transfer, the error signal of a current frame, the estimated noise signal of the current frame, and the estimated echo signal of the current frame to corresponding frequency domain signals, respectively, and calculates the variance ($\sigma_e^2$) of the error signal, variance ($\hat{\sigma}_n^2$) of the estimated noise signal, or variance ($\hat{\sigma}_y^2$) of the estimated echo signal according to the following equations:

$$\sigma_e^2(i) = \lambda\sigma_e^2(i-1) + (1-\lambda)\sum_{j=0}^{P} E_j(i)$$

$$\hat{\sigma}_n^2(i) = \lambda\hat{\sigma}_n^2(i-1) + (1-\lambda)\sum_{j=0}^{P} Noise_j(i)$$

$$\hat{\sigma}_y^2(i) = \lambda\hat{\sigma}_y^2(i-1) + (1-\lambda)\sum_{j=0}^{P} \hat{Y}_j(i),$$

wherein $\sigma_e^2(i)$ is the variance of the error signal in the i$^{th}$ frame, $\hat{\sigma}_n^2(i)$ is the variance of the estimated noise signal in the i$^{th}$ frame, $\hat{\sigma}_y^2(i)$ is the variance of the estimated echo signal in the i$^{th}$ frame, $E_j(i)$ represents energy at frequency j of the frequency domain signal of the error signal in the i$^{th}$ frame, $Noise_j(i)$ represents energy at frequency j of the frequency domain signal of the noise signal in the i$^{th}$ frame, and $\hat{Y}_j(i)$ represents energy at frequency j of the frequency domain signal of the estimated echo signal in the i$^{th}$ frame, wherein $0.9<\lambda<1$, $\lambda$ is a real number, $0<P\leq N/2-1$, P is a positive integral, and the value of P is determined by the non-linearity of the communication system.

14. The system as claimed in claim 8, wherein when the double-end talk detecting device determines that double-end talk has occurred, the echo estimating adaptation process of the echo estimating coefficient is disabled.

15. A circuit for eliminating echo in a speaker-microphone communication system, wherein the system comprises a noise energy estimating device, an echo estimating device, and an error signal determining device, comprising:
a determinant calculator, calculating a determinant ($\xi$), wherein the determinant ($\xi$) corresponds to the variance ($\sigma_e^2$) of an error signal from the error signal determining device and variance ($\hat{\sigma}_n^2$) of an estimated noise signal from the noise energy estimating device; and
a double-end talk detecting device, comparing the determinant ($\xi$) and a preset threshold, wherein when the determinant ($\xi$) is lower than the preset threshold, it is determined that double-end talk has not occurred, otherwise, it is determined that double-end talk has occurred.

16. The circuit of claim 15, wherein the determinant calculator calculates the determinant as $\xi = c \cdot |\sigma_e^2 - \hat{\sigma}_n^2|$, and 'c' is a constant.

17. The circuit of claim 15, wherein the determinant calculator calculates the determinant as $$0 \leq \xi = 1 - \left|\frac{\hat{\sigma}_n^2}{\sigma_e^2}\right|.$$

18. The circuit of claim 15, wherein the determinant calculator further performs the step of:
calculating a variance ($\hat{\sigma}_y^2$) of an estimated echo signal from the echo estimating device,
wherein the determinant $$\xi = \left|\frac{\sigma_e^2 - \hat{\sigma}_n^2}{\hat{\sigma}_y^2}\right|.$$

19. The circuit of claim 18, wherein the determinant calculator calculates variance ($\sigma_e^2$) of the error signal, the variance ($\hat{\sigma}_n^2$) of the estimated noise signal, and/or the variance ($\hat{\sigma}_y^2$) of the estimated echo signal for a whole frequency domain or for a low frequency domain, wherein the determinant calculator calculates the determinant ($\xi$) for each frame, and transfers, using N point Fast Fourier Transfer, the error signal of a current frame, the estimated noise signal of the current frame, and the estimated echo signal of the current frame to corresponding frequency domain signals, respectively, and calculates the variance ($\sigma_e^2$) of the error signal, variance ($\hat{\sigma}_n^2$) of the estimated noise signal, or variance ($\hat{\sigma}_y^2$) of the estimated echo signal according to the following equations:

$$\sigma_e^2(i) = \lambda\sigma_e^2(i-1) + (1-\lambda)\sum_{j=0}^{P} E_j(i)$$

$$\hat{\sigma}_n^2(i) = \lambda\hat{\sigma}_n^2(i-1) + (1-\lambda)\sum_{j=0}^{P} Noise_j(i)$$

$$\hat{\sigma}_y^2(i) = \lambda\hat{\sigma}_y^2(i-1) + (1-\lambda)\sum_{j=0}^{P} \hat{Y}_j(i),$$

wherein $\sigma_e^2(i)$ is the variance of the error signal in the i$^{th}$ frame, $\hat{\sigma}_n^2(i)$ is the variance of the estimated noise signal in the i$^{th}$ frame, $\hat{\sigma}_y^2(i)$ is the variance of the estimated echo signal in the i$^{th}$ frame, $E_j(i)$ represents energy at frequency j of the frequency domain signal of the error signal in the i$^{th}$ frame, $Noise_j(i)$ represents energy at frequency j of the frequency domain signal of the noise signal in the i$^{th}$ frame, and $\hat{Y}_j(i)$ represents energy at frequency j of the frequency domain signal of the estimated echo signal in the i$^{th}$ frame, wherein $0.9<\lambda<1$, $\lambda$ is a real number, $0<P\leq N/2-1$, P is a positive integral, and the value of P is determined by the non-linearity of the communication system.

20. The circuit of claim 15, wherein when the double-end talk detecting device determines that double-end talk has occurred, the echo estimating adaptation process of the echo estimating coefficient is disabled.

* * * * *